(12) United States Patent
Hwang et al.

(10) Patent No.: US 8,830,410 B2
(45) Date of Patent: Sep. 9, 2014

(54) LIQUID CRYSTAL DISPLAY WITH ELECTROSTATIC-RESISTANT WIRINGS

(75) Inventors: Jung-Hwan Hwang, Asan-si (KR); Kyung-Wook Kim, Seoul (KR); Young-Joon Cho, Asan-si (KR); Jong-Hwan Lee, Anyang-si (KR); Hye-Rhee Han, Suwon-si (KR)

(73) Assignee: Samsung Display Co., Ltd. (KR)

( * ) Notice: Subject to any disclaimer, the term of this patent is extended or adjusted under 35 U.S.C. 154(b) by 400 days.

(21) Appl. No.: 12/899,303

(22) Filed: Oct. 6, 2010

(65) Prior Publication Data

US 2011/0116019 A1    May 19, 2011

(30) Foreign Application Priority Data

Nov. 18, 2009    (KR) .................. 10-2009-0111647

(51) Int. Cl.
*G02F 1/1333* (2006.01)
*G02F 1/1345* (2006.01)
*G09G 3/36* (2006.01)

(52) U.S. Cl.
CPC .................................. *G02F 1/1333* (2013.01)
USPC .............. 349/40; 349/149; 349/152; 345/90; 345/104

(58) Field of Classification Search
USPC ........ 349/149, 153, 190, 42, 40, 152; 345/90, 345/104
See application file for complete search history.

(56) References Cited

U.S. PATENT DOCUMENTS

| | | | | |
|---|---|---|---|---|
| 7,436,480 | B2* | 10/2008 | Kang et al. | 349/149 |
| 7,495,737 | B2* | 2/2009 | Kim et al. | 349/149 |
| 7,692,377 | B2* | 4/2010 | Nakamura et al. | 313/505 |
| 2002/0018155 | A1* | 2/2002 | Nagata et al. | 349/42 |
| 2005/0122462 | A1* | 6/2005 | Park | 349/149 |
| 2006/0139556 | A1* | 6/2006 | Ahn et al. | 349/153 |
| 2007/0097306 | A1* | 5/2007 | Jung et al. | 349/143 |
| 2007/0139600 | A1 | 6/2007 | Lee et al. | |
| 2010/0066968 | A1* | 3/2010 | Yoon et al. | 349/149 |

FOREIGN PATENT DOCUMENTS

| | | | | |
|---|---|---|---|---|
| JP | 07-311385 | A | 11/1995 | |
| JP | 09152620 | A * | 6/1997 | ............ G02F 1/1345 |
| JP | 2001-142084 | A | 5/2001 | |
| JP | 2008-275908 | A | 11/2008 | |
| JP | 2009-098634 | A | 5/2009 | |
| KR | 1020070062088 | A | 6/2007 | |
| KR | 1020070072320 | A | 7/2007 | |
| KR | 2007116511 | | * 12/2007 | |
| KR | 1020070116511 | A | 12/2007 | |
| KR | 1020080019838 | A | 3/2008 | |
| KR | 1020080065373 | A | 7/2008 | |
| KR | 1020090036198 | A | 4/2009 | |

* cited by examiner

*Primary Examiner* — Hoan C Nguyen
(74) *Attorney, Agent, or Firm* — Cantor Colburn LLP

(57) ABSTRACT

A liquid crystal display includes a first substrate and a second substrate facing each other, common voltage wiring disposed on the first substrate and transmitting a common voltage, a first insulating layer disposed on the common voltage wiring, a common electrode disposed on a whole surface of the second substrate, a first conductive member disposed between the first substrate and the second substrate and electrically connecting the common electrode and the common voltage wiring to each other, and a sealant combining the first substrate and the second substrate. The first insulating layer includes a first contact hole exposing a first portion of the common voltage wiring and a plurality of a second contact hole exposing a second portion of the common voltage wiring, the second contact hole having a smaller area than the first contact hole.

19 Claims, 14 Drawing Sheets

LIQUID CRYSTAL DISPLAY WITH ELECTROSTATIC-RESISTANT WIRINGS

This application claims priority to Korean Patent Application No. 10-2009-0111647 filed on Nov. 18, 2009, and all the benefits accruing therefrom under §119, the entire contents of which are incorporated herein by reference.

BACKGROUND OF THE INVENTION (a) Field of the Invention

The invention relates to a liquid crystal display.

(b) Description of the Related Art

Flat panel display devices have exploded onto the market, and sales thereof are growing quickly. The flat panel display is a display device that is thin compared with the size of the screen thereof, and a liquid crystal display ("LCD") and an organic light emitting device ("OLED") are among widely used flat panel displays.

A liquid crystal display is one of flat panel displays that are now widely used. The liquid crystal display includes two display panel sheets in which field generating electrodes such as pixel electrodes and a common electrode are formed, and a liquid crystal layer interposed between the display panel sheets. In the liquid crystal display, a voltage is applied to the field generating electrodes to generate an electric field in the liquid crystal layer, which determines the direction of liquid crystal molecules of the liquid crystal layer, and imaged are displayed by controlling the polarization of incident light.

Among the liquid crystal displays, a liquid crystal display having a structure in which field generating electrodes are respectively formed on two display panels is widely used. Particularly, a general structure of the widely used liquid crystal displays includes one display panel having a plurality of pixel electrodes disposed in a matrix form, and the other panel having a common electrode covering the whole surface thereof. In the liquid crystal display, each pixel electrode is separately applied with a voltage, and the common electrode is applied with a common voltage to display images.

A thin film transistor ("TFT") as a three terminal element is connected to each pixel electrode for switching the voltage applied to the pixel electrode, and a plurality of gate lines transmitting signals to control the thin film transistor, and a plurality of data lines transmitting the voltage that is applied to the pixel electrode are provided. Also, to apply the common voltage to the common electrode, the display panel including the thin film transistor and the pixel electrode further includes wiring transmitting the common voltage. A short point is formed by dripping conductive balls at a portion of a region of the display panel, and the common voltage wiring and the common electrode are electrically connected to each other through the short point. To form a uniform equipotential at the common electrode, a sufficient number of the short points are required, but the number of short points is limited by the spatial capacity and several conditions during the process.

BRIEF SUMMARY OF THE INVENTION

A liquid crystal display according to an exemplary embodiment of the invention includes a first substrate and a second substrate facing each other, a common voltage wiring disposed on the first substrate and transmitting a common voltage, a first insulating layer disposed on the common voltage wiring, a common electrode disposed on a whole surface of the second substrate, a first conductive member disposed between the first substrate and the second substrate and electrically connecting the common electrode and the common voltage wiring to each other, and a sealant combining the first substrate and the second substrate. The first insulating layer includes a first contact hole exposing a first portion of the common voltage wiring, and a plurality of a second contact hole exposing a second portion of the common voltage wiring, the second contact hole having a smaller area than the first contact hole.

An area of the first contact hole may be five times or more an area of the second contact hole.

At least one of a longitudinal width and a transverse width of the second contact hole may be equal to or more than 2 micrometers (μm) and equal to or less than 12 micrometers (μm).

A distance between adjacent second contact holes may be equal to or more than 20 μm and equal to or less than 130 μm.

The liquid crystal display may further include a first contact assistant disposed on the first insulating layer and electrically connected to the first portion and the second portion through the first contact hole and the second contact hole, respectively. The first conductive member may contact the first contact assistant.

The first conductive member may form a short point and may overlap at least a portion of the first portion.

The first conductive member may be included in the sealant.

The sealant may overlap at least a portion of the plurality of the second contact holes.

The first portion and the second portion may be adjacent to each other and may be connected to each other.

The liquid crystal display may further include a test signal wire disposed on the first substrate and a second contact assistant electrically connected to the test signal wire. The first insulating layer may further include a third contact hole exposing a portion of the test signal wire, the second contact assistant may be electrically connected to the test signal wire through the third contact hole, and the sealant and the second contact assistant may not overlap each other.

The first conductive member may be included in the sealant.

The liquid crystal display may further include a first electrostatic-resistant wiring disposed on the first substrate, second electrostatic-resistant wiring disposed on the first insulating layer, a second insulating layer disposed on the second electrostatic-resistant wiring, and a second conductive member disposed between the first substrate and the second substrate and electrically connecting the common electrode with at least one of the first electrostatic-resistant wiring and the second electrostatic-resistant wiring.

The first insulating layer and the second insulating layer may include a fourth contact hole exposing a portion of the first electrostatic-resistant wiring, and the second insulating layer may further include a fifth contact hole exposing a portion of the second electrostatic-resistant wiring. A third contact assistant connecting the first electrostatic-resistant wiring and the second electrostatic-resistant wiring through the fourth contact hole, the fifth contact hole may be disposed on the second insulating layer, and the second conductive member may contact the third contact assistant.

The second conductive member may be included in the sealant.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION OF THE INVENTION

Figure 1:
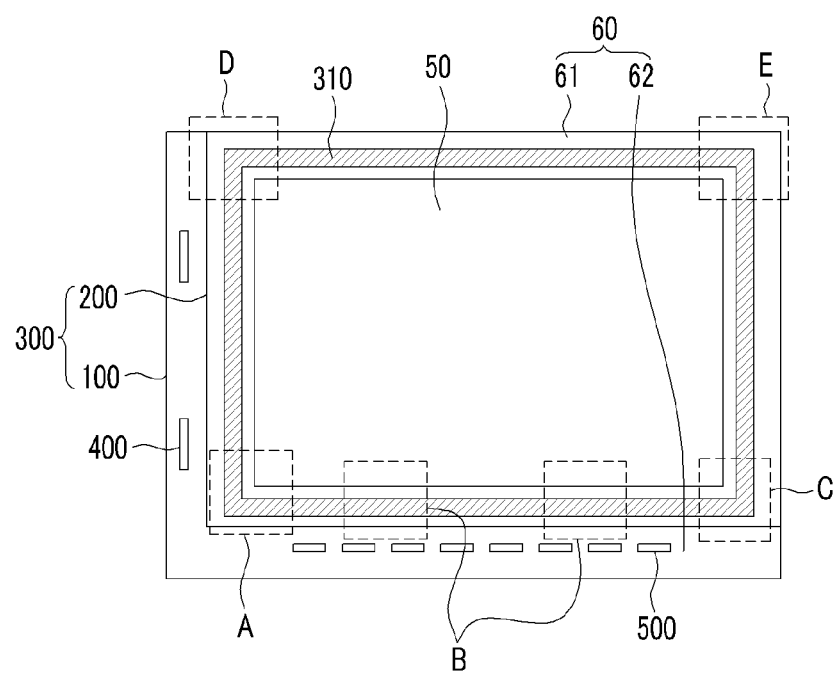
FIG. 1 is a top plan view of an exemplary embodiment of a liquid crystal display according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be described in detail with reference to the accompanying drawings.

A technique in which a sealant for combining two display panels includes conductive members (e.g., balls) having conductivity is used instead of short points has been developed. A liquid crystal display according to an exemplary embodiment of the invention will be described with reference to FIG. 1 to FIG. 14.

FIG. 1 is an exemplary embodiment of a top plan view of a liquid crystal display according to the invention.

Referring to FIG. 1, a liquid crystal display according to an exemplary embodiment of the invention includes a lower panel 100 and an upper panel 200, and a liquid crystal layer (not shown) interposed therebetween. The lower panel 100 and the upper panel 200 together form a liquid crystal panel assembly 300.

In addition, in a view of the plane structure, the lower panel 100 and the upper panel 200 include a display area 50 displaying images and a peripheral area 60 disposed around the display area 50.

The display area 50 includes a plurality of a signal line (not shown) and a plurality of a pixel (not shown) connected thereto and arranged in an approximately matrix.

The signal lines are provided in the lower panel 100, and include a gate line (not shown) transmitting a gate signal (referred to as "a scanning signal") and a data line (not shown) transmitting a data voltage. An exemplary embodiment may include a plurality of the gate line and a plurality of the data line.

Each pixel includes a switching element (not shown) such as a thin film transistor connected to the signal line, a pixel electrode (not shown) connected to the switching element and disposed in the lower panel 100, a common electrode (not shown) disposed in the upper panel 200, and a liquid crystal layer (not shown). The pixel electrode receives the data voltage through the switching element. The common electrode is disposed on substantially a whole surface of the upper panel 200 and receives the common voltage (Vcom).

If the gate line is applied with the gate signal, the data voltage is applied to the pixel electrode of the lower panel 100 through the data line, and the pixel electrode forms an electric field to the liquid crystal layer along with the common electrode of the upper panel 200 applied with the common voltage. Thus, the degree of polarization of incident light to the liquid crystal layer is changed according to the inclination degree of the liquid crystal molecules of the liquid crystal layer, and the change of the polarization is represented with a change of transmittance by a polarizer, and thereby a liquid crystal display displays images.

The peripheral area 60 includes a first peripheral area 61 overlapping both the lower panel 100 and the upper panel 200 in the plan view, and a second peripheral area 62 where the upper panel 200 is not present and the lower panel 100 is exposed by the upper panel 200. The second peripheral area 62 is disposed around the first peripheral area 61, such as disposed outside of boundaries of the first peripheral area 61. The first and second peripheral areas collectively form a single peripheral area around the display area 50 in the plan view.

A sealant 310 combining and fixing the lower panel 100 and the upper panel 200, and enclosing the liquid crystal layer is disposed in the first peripheral area 61. The sealant 310 is disposed spaced apart from and along the circumference of the display area 50, and may include conductive balls (not shown) having conductivity. An entire of the sealant 310 is disposed in the first peripheral area 61, and encloses the display area 50 on all sides in the plan view of the liquid crystal panel assembly 300.

A gate driver 400 and a data driver 500 are positioned in the second peripheral area 62. The gate driver 400 is connected to the gate line of the display area 50 and applies gate signals including a gate-on voltage (Von) for turning on a switching element and a gate-off voltage (Voff) for turning off the switching element to the gate lines. The data driver 500 is connected to the data line of the display area 50 and applies the data voltage to the data lines. The gate driver 400 and the data driver 500 may be directly mounted on the lower panel 100 of the second peripheral area 62 in the form of at least one integrated circuit ("IC") chip, may be mounted on a flexible printed circuit film (not shown) to be attached to the lower panel 100 in a tape carrier package ("TCP") type, or may be integrated onto the lower panel 100 along with the thin film transistor. An exemplary embodiment of the liquid crystal panel assembly 300 may include a plurality of the gate driver 400 and/or a plurality of the data driver 500.

Portions A, B, C, D, and E of the liquid crystal display shown in FIG. 1 will be described in detail.

Firstly, portion B will be described.

Figure 2:
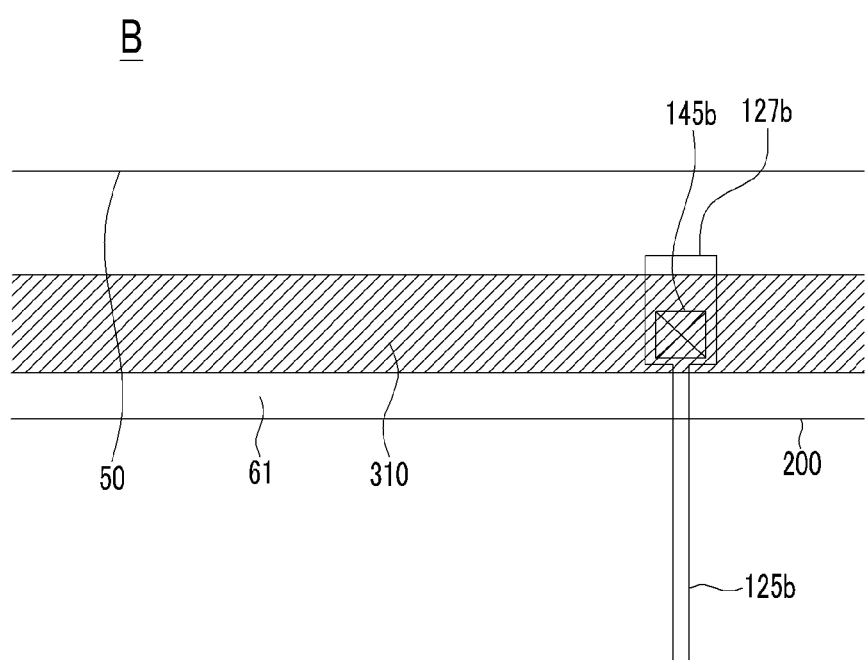
FIG. 2 is an enlarged view of portion B of the liquid crystal display shown in FIG. 1.
Figure 3:
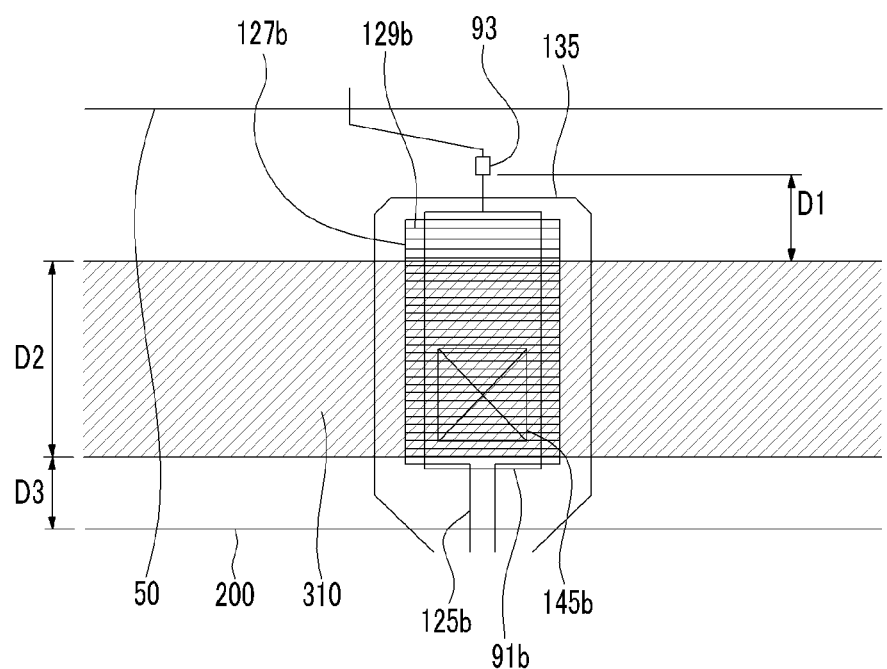
FIG. 3 is an enlarged view of a portion of FIG. 2.
Figure 4:
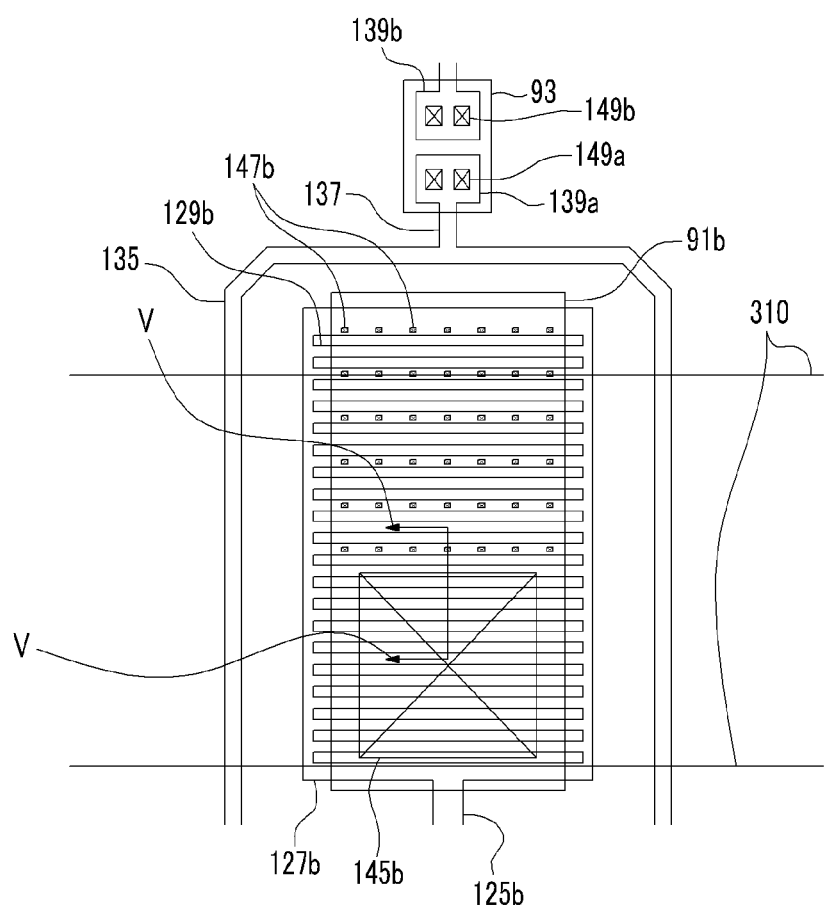
FIG. 4 is an enlarged view of a portion of FIG. 3.
Figure 5:
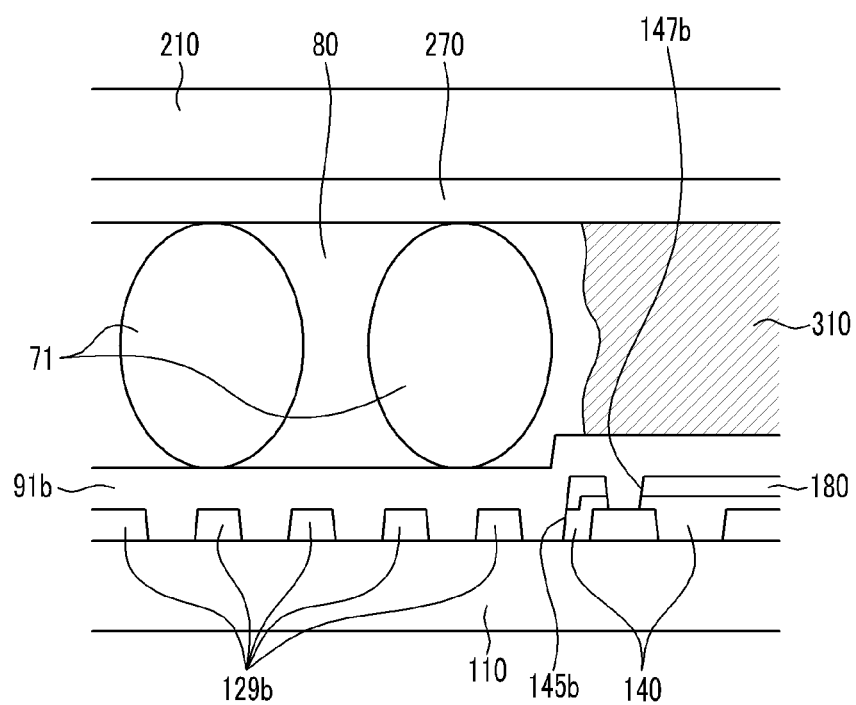
FIG. 5 is an exemplary embodiment of a cross-sectional view of the liquid crystal display shown in FIG. 4 taken along line V-V.
Figure 6:
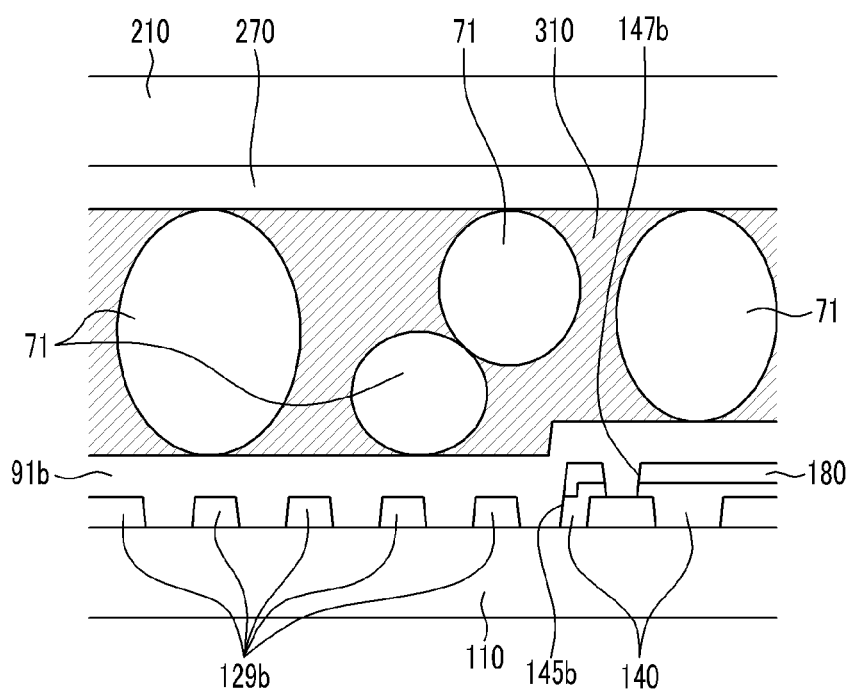
FIG. 6 is another exemplary embodiment of a cross-sectional view of the liquid crystal display shown in FIG. 4 taken along line V-V.

FIG. 2 is an enlarged view of portion B of the liquid crystal display shown in FIG. 1, FIG. 3 is an enlarged view of a portion of FIG. 2, FIG. 4 is an enlarged view of a portion of FIG. 3, FIG. 5 is an exemplary embodiment of a cross-sectional view of the liquid crystal display shown in FIG. 4 taken along line V-V, and FIG. 6 is another exemplary embodiment of a cross-sectional view of the liquid crystal display shown in FIG. 4 taken along line V-V.

Referring to the lower panel 100, common voltage wiring 125b and a test signal wire 135 are disposed on a lower substrate 110.

The common voltage wiring 125b transmits the common voltage Vcom. The common voltage wiring 125b mainly extends in the longitudinal direction, and includes an expansion 127b completely disposed in the first peripheral area 61. Referring to FIG. 4, the expansion 127b includes a pair of longitudinal portions and a plurality of a transverse portion 129b connecting the two longitudinal portions. However, the shape of the common voltage wiring 125b is not limited thereto and may be variously changed. The longitudinal portions and the transverse portions 129b collectively form a single unitary indivisible expansion 127b.

The test signal wire 135 is wiring for applying a test signal to the signal lines of the display area 50. In the plan view, the test signal wire 135 extends as two branches in the longitudinal direction at both of opposing longitudinal sides of the common voltage wiring 125b. The two branches of the test signal wire 135 meet each other above the expansion 127b of the common voltage wiring 125b, thereby forming one protrusion 137. The protrusion 137 includes a first expansion 139a for a connection with another layer and a second expansion 139b separated from and facing the first expansion 139a in the plan view. The test signal wire 135 again obliquely extends from the protrusion 137 towards the display area 50.

A gate insulating layer 140 including an insulating material is disposed on the common voltage wiring 125b and the test signal wire 135. A data conductive layer (not shown) may be further disposed on the gate insulating layer 140.

A passivation layer 180 is disposed directly on the gate insulating layer 140. In an alternative embodiment, the passivation layer 180 may be omitted.

The gate insulating layer 140 and the passivation layer 180 include a first contact hole 145b extending completely therethrough, and exposing substantially wholly a lower half portion of the expansion 127b of the common voltage wiring 125b, in the plan view. The first contact hole 145b is an enclosed opening penetrating through the gate insulating layer 140 and the passivation layer 180, such that the gate insulating layer 140 and the passivation layer 180 solely define the enclosed first contact hole 145b.

The gate insulating layer 140 and the passivation layer 180 include a second contact hole 147b exposing a portion of the transverse portion 129b disposed at an upper half portion of the expansion 127b in the plan view, and third contact holes 149a and 149b respectively exposing a portion of the first expansion 139a of the test signal wire 135 and a portion of the second expansion 139b of the test signal wire 135. The second and third contact holes 147b, 149a and 149b are enclosed openings penetrating through the gate insulating layer 140 and the passivation layer 180, such that the gate insulating layer 140 and the passivation layer 180 solely define the enclosed second and third contact holes 147b, 149a and 149b.

A plurality of the second contact hole 147b may be arranged in a line substantially parallel to the transverse portion 129b. Also, as shown in FIG. 4, the second contact holes 147b may be disposed per two transverse portions 129b in the longitudinal direction, such that transverse portions 129b overlapping the second contact holes 147b and transverse portions 129b not overlapping the second contact holes 147b may be alternately positioned. Alternatively, the second contact holes 147b may be disposed per three transverse portions 129b. A distance between adjacent second contact holes 147b disposed on one transverse portion 129b may be from about 20 micrometers (μm) to about 100 micrometers (μm), more particularly, from about 40 μm to about 80 μm. Also, a distance between two second contact holes 147b disposed on different transverse portions 129b may be from about 50 μm to about 130 μm, more particularly, from about 70 μm to about 110 μm.

An a real size of the second contact hole 147b may be smaller than that of the first contact hole 145b. In an exemplary embodiment, the area of the first contact hole 145b may be five times or more the area of the second contact hole 147b. Each of the transverse and longitudinal widths of the second contact hole 147b may be from about 2 μm to about 12 μm, more particularly, from about 4 μm to about 10 μm.

However, the planar shape of the first contact hole 145b and the second contact hole 147b are not limited thereto, and may be variously changed.

A plurality of contact assistants 91b and 93 are disposed on the passivation layer 180. The contact assistant 91b is disposed directly on and overlapping a transverse portion 129b of the expansion 127b of the common voltage wiring 125b, and is physically and electrically connected to the expansion 127b of the common voltage wiring 125b through the first contact hole 145b and the second contact hole 147b. The contact assistant 93 is disposed overlapping the first expansion 139a and the second expansion 139b of the test signal wire 135, and is physically and electrically connected to the first expansion 139a and the second expansion 139b through the third contact holes 149a and 149b, respectively. The contact assistants 91b and 93 may include a transparent conductive material such as indium tin oxide ("ITO") or indium zinc oxide ("IZO"), or a metal such as aluminum, silver, chromium, or alloys thereof.

Referring to the upper panel 200, a common electrode 270 including a transparent conductor such as ITO and IZO, is disposed on an upper substrate 210.

The lower panel 100 and the upper panel 200 are combined with each other through the sealant 310. The sealant 310 overlaps most of the expansion 127b of the common voltage wiring 125b. In the plan view, a width D2 (FIG. 3) of the sealant 310 may be from about 0.3 millimeter (mm) to about 1.8 millimeters (mm), and in detail, from about 0.5 mm to about 1.4 mm. Also, the distance D3 between the sealant 310 and an edge of the upper panel 200 may be from about 200 μm to about 600 μm.

Referring to FIG. 5, the common electrode 270 is electrically connected to the contact assistants 91b and the expansion 127b of the common voltage wiring 125a in the lower panel 100 through conductive members (e.g., balls) 71 disposed overlapping the first contact hole 145b, thereby receiving the common voltage. The conductive balls 71 are dispersed in a conductive ball medium material 80, such as an organic material and polymer. Each of the conductive balls 71 directly contact the common electrode 270, and directly contact the contact assistant 91b and/or the expansion 127b of the common voltage wiring 125a. The conductive balls 71 are limited to being disposed in the first contact hole 145b and contacting a portion of the common voltage wiring 125a, and are not overlapped with the sealant 310.

The conductive balls 71 may be an elastic member having a substantially spherical shape, and may be coated by a metal material having conductivity such as gold (Au) or silver (Ag). A size of individual one of the conductive balls 71 may be equal to or more than a distance between the lower panel 100 and the upper panel 200, that is, a cell gap. When the size of each of the conductive balls 71 is initially more than the cell gap, the conductive ball 71 is compressed to a height substantially equal to the cell gap when the lower panel 100 and the upper panel 200 are combined, since the conductive balls 71 have elasticity. As described above, the conductive balls 71 and the conductive ball medium material 80 that are disposed limitedly in the first contact hole 145b and contacting the portion of the common voltage wiring 125a, collectively form one short point. The short point construction illustrated in FIG. 5 may be limited to a portion of the common voltage wiring 125 only where the first contact hole 145b is disposed, the portion being an area except for where the sealant 310 is disposed.

As shown in FIG. 6, according to another exemplary embodiment of the invention, short points including limitedly disposed conductive balls 71 and the conductive ball medium material 80 are not provided, but the conductive balls 71 are included in the sealant 310 as a medium. Accordingly, the conductive balls 71 included in the sealant 310 overlapping portions of the expansion 127b of the common voltage wiring 125a electrically connects the contact assistants 91b to the common electrode 270.

The conductive balls 71 included in the sealant 310 also have the same characteristics as the conductive balls 71 of the short point described above with reference to FIG. 5. However, individual ones of the conductive balls 71 included in the sealant 310 may have a size less than the cell gap, as shown in FIG. 6. Also, sizes of the conductive balls 71 included in the sealant 310 may be various, as shown in FIG. 6, or may be uniform. The sealant 310 including the conductive balls 71 is referred to as a conductive sealant hereinafter. The construction illustrated in FIG. 6 using the conductive sealant may not be limited to a portion of the common voltage wiring 125 only where the sealant 310 is shown in FIG. 5, but the conductive sealant may be disposed on both a portion where the first contact hole 145b is disposed and a portion where the sealant 310 of FIG. 5 is disposed. The conductive sealant as shown in FIG. 6, may be a continuous single unitary indivisible member.

As described above, the size of the second contact hole 147b is much smaller than the first contact hole 145b, and the distances between the second contact holes 147b are widened, such that the contact resistance between the conductive balls 71 and the common electrode 270 may be reduced when using the conductive sealant.

When the sealant 310 is the conductive sealant, the sealant 310 and the contact assistants 93 of the test signal wire 135 do not overlap. In one exemplary embodiment, a distance D1 (FIG. 3) between edges of the sealant 310 and the contact assistants 93 of the test signal wire 135 may be from about 200 μm to about 1000 μm, more particularly, from about 400 μm to about 800 μm.

In an alternative exemplary embodiment, the conductive sealant shown in FIG. 6 may be disposed only in place of the sealant 310 as shown in FIG. 5 after the short point is disposed on the lower panel 100, and then the lower panel 100 and the upper panel 200 may be combined with the conductive sealant. Thus, the short point structure of FIG. 5 and the conductive sealant material of FIG. 6 may be used together to apply the common voltage to the common electrode 270. In this alternative embodiment, with reference to FIG. 5, the short point construction would be limited to a portion of the common voltage wiring 125b only where the first contact hole 145b is disposed, the portion being an area except for where the sealant 310 is disposed, and the conductive sealant including the conductive balls 71 would be disposed in a separate portion where only the sealant 310 is shown disposed in FIG. 5. The separate portion would be an area including the second contact holes 147b only, or an entire of a remaining portion of the common voltage wiring 125b except for where the first contact hole 145b is disposed.

As described above, the expansion 127b of the common voltage wiring 125b of the lower panel 100 includes two portions in a plan view, where the first contact hole 145b is disposed in the gate insulating layer 140 and defines a first portion, and the second contact hole 147b having a different a real size from the first contact hole 145b is disposed in the gate insulating layer 140 in a second portion, such that a structure using both the short point and conductive sealant may be used together. That is, any one of the structure using the short point and the structure using the conductive sealant may be easily selected according to the manufacturing device of the liquid crystal display, and the two structures may be used together. Where the short point and the conductive sealant are used together, a uniform equipotential is formed at the common electrode and a number of the short points can be reduced.

Next, portions A and C of the liquid crystal display shown in FIG. 1 will be described with reference to FIG. 7 to FIG. 10. Like reference numerals are assigned to the same constituent elements as in the exemplary embodiments in FIGS. 2 through 6, and the same description is omitted. Since the structures of the portions A and C of the liquid crystal display shown in FIG. 1 are similar to each other, they will be described together herein.

Figure 7:
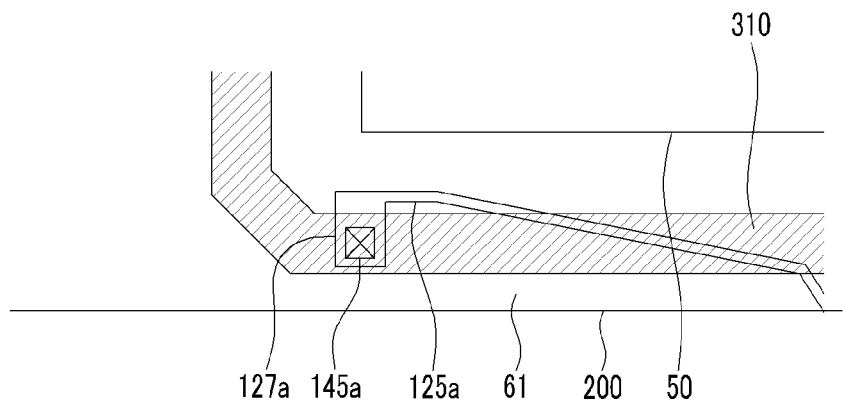
FIG. 7 is an enlarged view of portion A of the liquid crystal display shown in FIG. 1.
Figure 8:
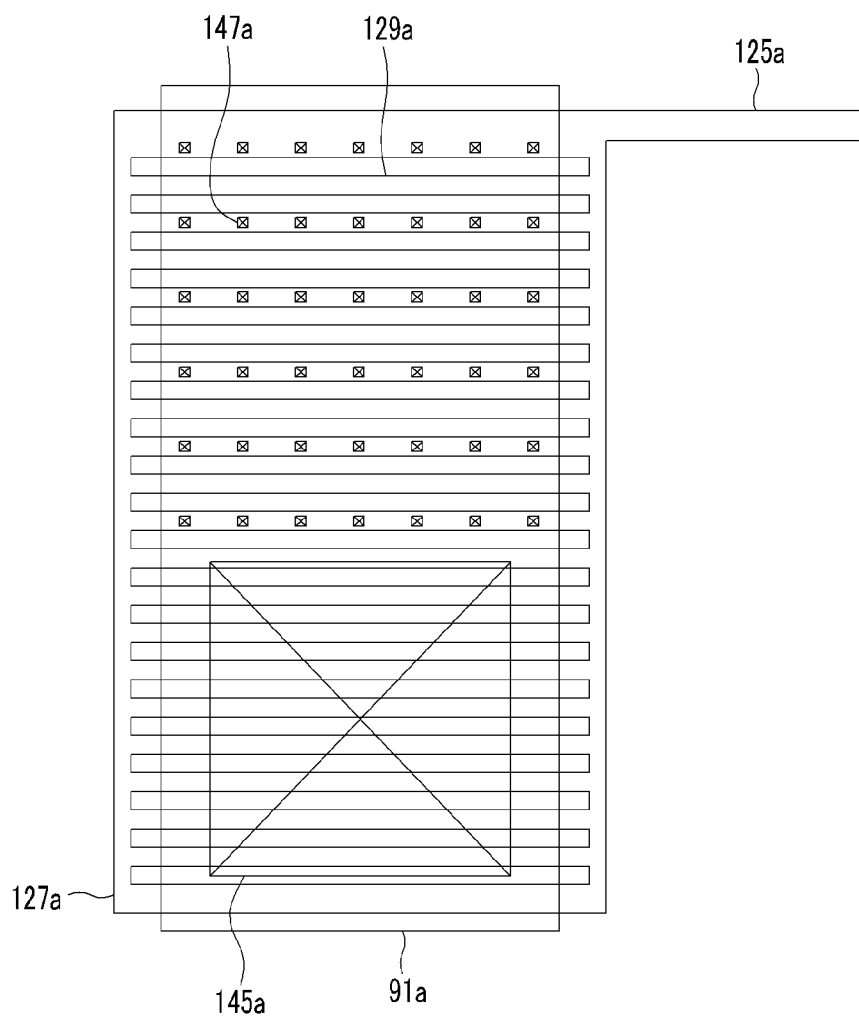
FIG. 8 is an enlarged view of a portion of FIG. 7.
Figure 9:
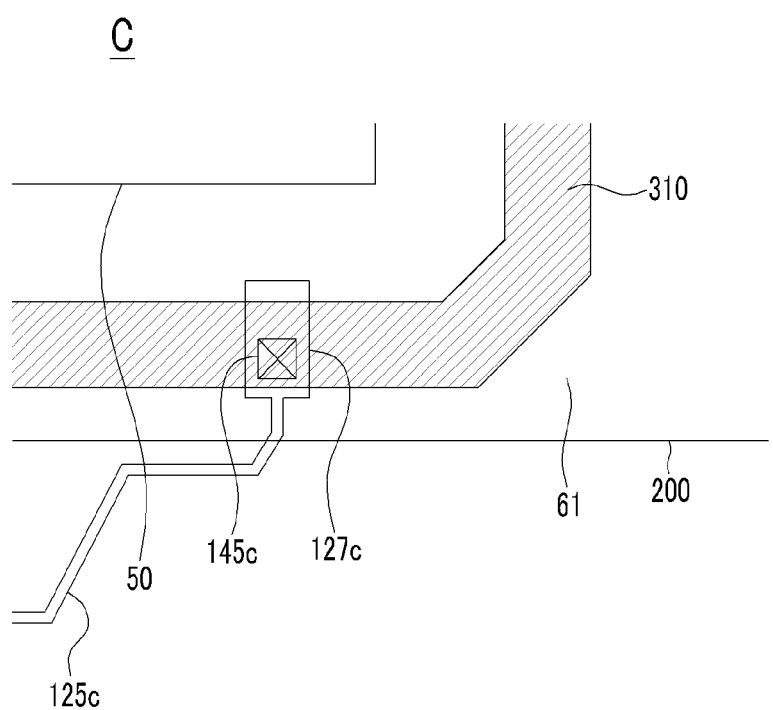
FIG. 9 is an enlarged view of portion C of the liquid crystal display shown in FIG. 1.
Figure 10:
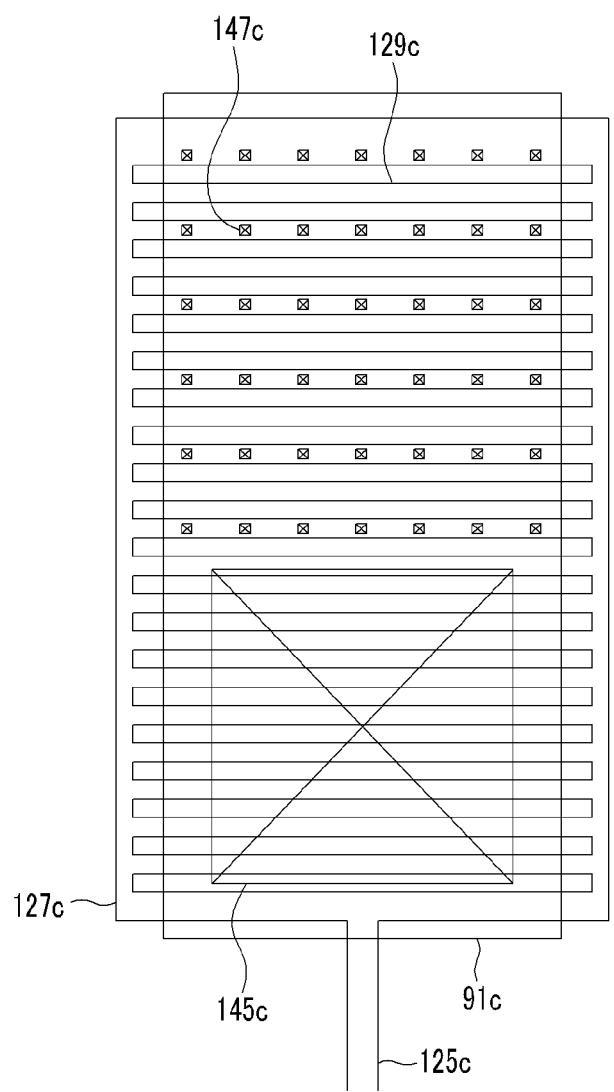
FIG. 10 is an enlarged view of a portion of FIG. 9.

FIG. 7 is an enlarged view of portion A of the liquid crystal display shown in FIG. 1, FIG. 8 is an enlarged view of a portion of FIG. 7, FIG. 9 is an enlarged view of portion C of the liquid crystal display shown in FIG. 1, and FIG. 10 is an enlarged view of a portion of FIG. 9.

Referring to FIG. 7 and FIG. 9, the cross-sectional structure of the portions A and C of the liquid crystal display shown in FIG. 1 is almost the same as that of the portion B.

Referring to the lower panel 100, common voltage wiring 125a is disposed on the lower substrate 110 in portion A, and common voltage wiring 125c is disposed on the lower substrate 110 of the portion C.

The common voltage wirings 125a and 125c transmit the common voltage and extend substantially obliquely to longitudinal and transverse edges of the lower panel 100. The common voltage wiring 125a includes an expansion 127a disposed in the first peripheral area 61, and the common voltage wiring 125c includes an expansion 127c disposed in the first peripheral area 61. Referring to FIG. 8 and FIG. 10, the expansions 127a and 127c include a pair of longitudinal portions and a plurality of transverse portions 129a and 129c connecting the pair of longitudinal portions. The longitudinal portions and the transverse portions 129a and 129c collectively form single unitary indivisible expansions 127a and 127c, respectively.

A gate insulating layer 140 is disposed on the common voltage wiring 125a and 125c, and the data conductive layer (not shown) may be further disposed on the gate insulating layer 140.

A passivation layer 180 is disposed directly on the gate insulating layer 140. In an alternative embodiment, the passivation layer 180 may be omitted.

The gate insulating layer 140 and the passivation layer 180 include a first contact hole 145a and 145c substantially wholly exposing a lower half portion of the expansion 127a and 127c of the common voltage wiring 125a and 125c, in the plan view. The gate insulating layer 140 and the passivation layer 180 include a plurality of second contact holes 147a and 147c respectively exposing a portion of the transverse portions 129a and 129c that are disposed at an upper half portion of the expansions 127a and 127c, in the plan view. The first and second contact holes 145a, 145c, 147a and 147c are enclosed openings penetrating through the gate insulating layer 140 and the passivation layer 180, such that the gate insulating layer 140 and the passivation layer 180 solely define the enclosed first and second contact holes 145a, 145c, 147a and 147c.

A plurality of contact assistants 91a and 91c are disposed on the passivation layer 180.

Referring to the upper panel 200, the common electrode 270 is disposed on the whole surface of the upper substrate 210.

The lower panel 100 and the upper panel 200 are combined by the sealant 310.

The detailed description of the first contact holes 145a and 145c and the second contact holes 147a and 147c, the contact assistants 91a and 91c, the common electrode 270, and the sealant 310 is the same as the exemplary embodiment in FIGS. 2 through 6, such that repetitive description is omitted.

In the illustrated exemplary embodiment, the common voltage wiring 125a and 125c and the contact assistants 91a and 91c physically and electrically connected thereto, may also be electrically connected to the common electrode 270 through only the short point structure using the first contact holes 145a and 145c, or may be physically and electrically connected through the conductive sealant using the first contact holes 145a and 145c and/or the second contact holes 147a and 147c. The detailed description thereof is the same as the exemplary embodiment in FIGS. 2 through 6, such that repetitive description is omitted.

As described above, the first and second contact holes 145a, 145b, 145c, 147a, 147b, and 147c for enabling use of the short point and the conductive sealant together are disposed at several positions of the first peripheral area 61 of the lower portion of the liquid crystal display, thereby forming the equipotential at the common electrode 270 of the upper panel 200. Where the short point and the conductive sealant are used together, a uniform equipotential is formed at the common electrode and a number of the short points can be reduced.

Next, portions D and E of the liquid crystal display shown in FIG. 1 will be described with reference to FIG. 11 to FIG. 14. Like reference numerals are assigned to the same constituent elements as in the exemplary embodiments in FIGS. 2 through 10, and the same description is omitted. Since the structures of the portions A and C of the liquid crystal display shown in FIG. 1 are similar to each other, they will be described together herein.

Figure 11:
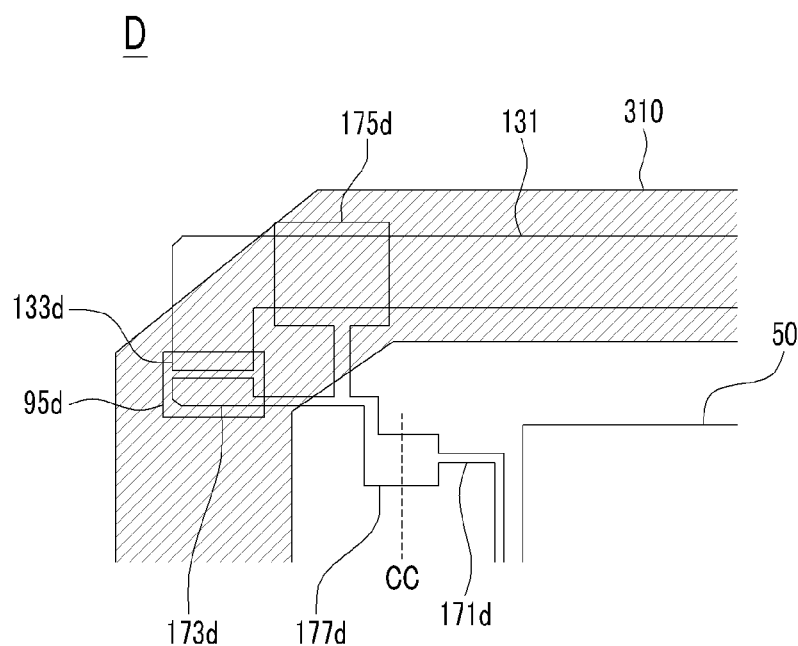
FIG. 11 is an enlarged view of portion D of the liquid crystal display shown in FIG. 1.
Figure 12:
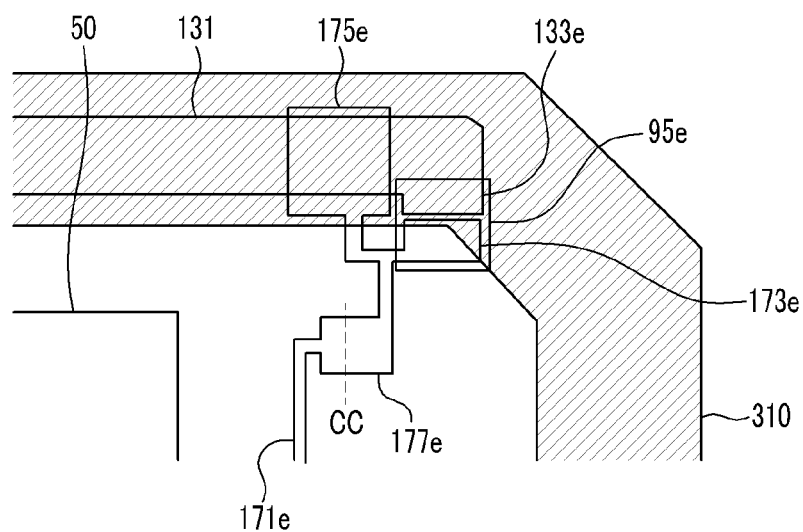
FIG. 12 is an enlarged view of portion E of the liquid crystal display shown in FIG. 1.
Figure 13:
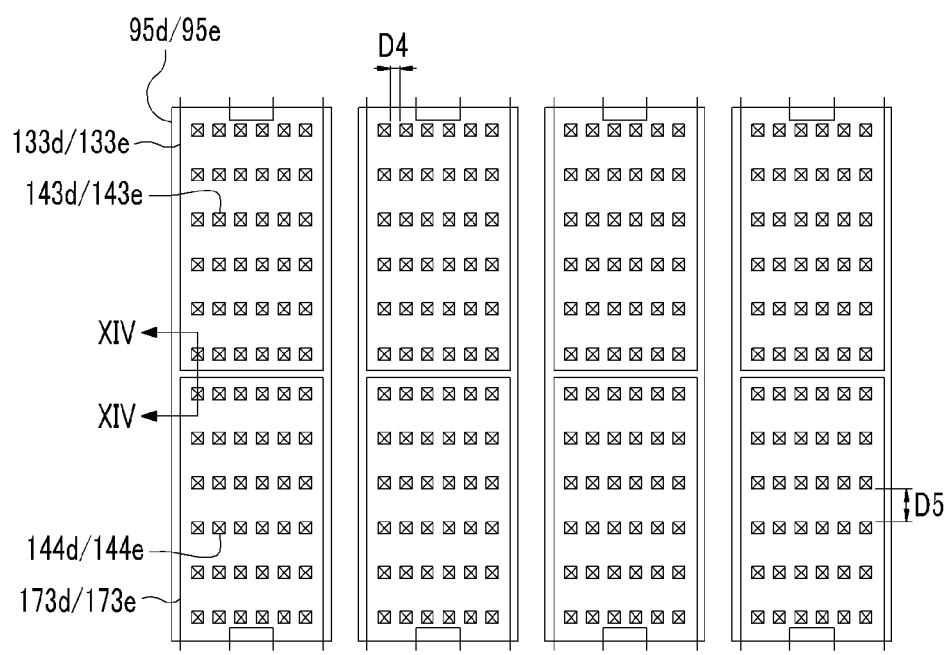
FIG. 13 is an enlarged view of a portion of FIG. 11 and FIG. 12.
Figure 14:
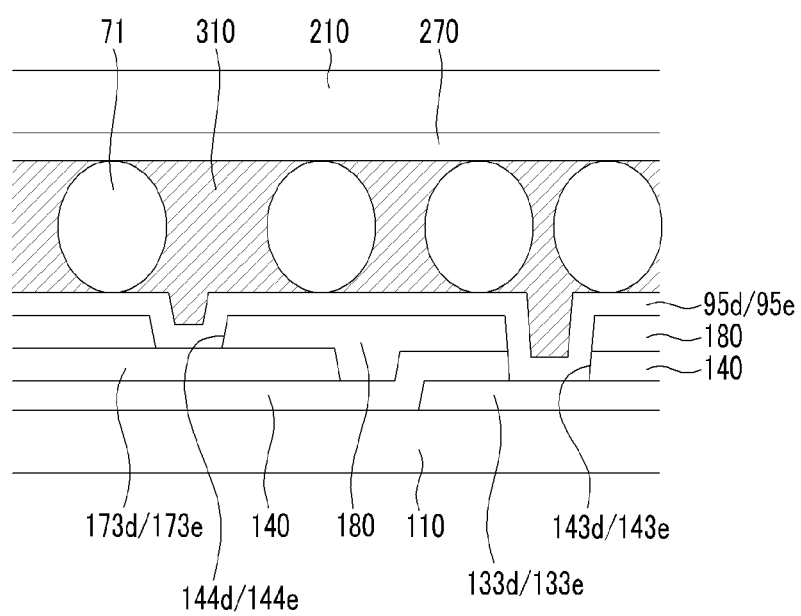
FIG. 14 is a cross-sectional view of the liquid crystal display shown in FIG. 13 taken along line XIV-XIV.

FIG. 11 is an enlarged view of portion D of the liquid crystal display shown in FIG. 1, FIG. 12 is an enlarged view of portion E of the liquid crystal display shown in FIG. 1, FIG. 13 is an enlarged view of a portion of FIG. 11 and FIG. 12, and FIG. 14 is a cross-sectional view of the liquid crystal display shown in FIG. 13 taken along line XIV-XIV.

Referring to the lower panel 100, first electrostatic-resistant wiring 131 is disposed on the lower substrate 110. The first electrostatic-resistant wiring 131 extends and is elongated substantially in the transverse direction of the liquid crystal display, and includes end portions 133d and 133e at the right and left ends in the plan view of FIG. 1, respectively. The first electrostatic-resistant wiring 131 may include a metal including aluminum (Al), silver (Ag), copper (Cu), molybdenum (Mo), chromium (Cr), tantalum (Ta), titanium (Ti), and alloys thereof.

A gate insulating layer 140 is disposed directly on the first electrostatic-resistant wiring 131.

Second electrostatic-resistant wiring 171d and 171e is disposed directly on the gate insulating layer 140. The second electrostatic-resistant wiring 171d extends mainly in the longitudinal direction along the left edge of the display area 50 in the plan view, and includes an expansion 177d protruding leftward at an upper portion of second electrostatic-resistant wiring 171d, and another expansion 175d and an end portion 173d both again extending from the expansion 177d. The second electrostatic-resistant wiring 171e extends mainly in the longitudinal direction along the right edge of the display area 50 in the plan view, and includes an expansion 177e protruding rightward at the upper portion of the second electrostatic-resistant wiring 171e, and an expansion 175e and an end portion 173e both again extending from the expansion 177e.

The expansions 175d and 175e respectively overlap the first electrostatic-resistant wiring 131, thereby forming a capacitor for electrostatic withstanding.

The end portion 173d of the second electrostatic-resistant wiring 171d faces the end portion 133d of the first electrostatic-resistant wiring 131 in the plan view, and the end portion 173e of the second electrostatic-resistant wiring 171e faces the end portion 133e of the first electrostatic-resistant wiring 131 in the plan view. As shown in FIG. 13, the end portions 133d and 133e of the first electrostatic-resistant wiring 131 and the end portions 173d and 173e of the second electrostatic-resistant wiring 171d and 171e may be divided into several branches.

The first electrostatic-resistant wiring 131 may be disposed in the same layer as the common voltage wiring 125a, 125b, and 125c mentioned above.

The passivation layer 180 is disposed on the second electrostatic-resistant wiring 171d and 171e.

The gate insulating layer 140 and the passivation layer 180 include a plurality of fourth contact holes 143d and 143e respectively exposing a portion of the end portion 133d and 133e of the first electrostatic-resistant wiring 131. The fourth contact holes 143d and 143e are enclosed openings penetrating through the gate insulating layer 140 and the passivation layer 180, such that the gate insulating layer 140 and the passivation layer 180 solely define the enclosed fourth contact holes 143d and 143e.

The passivation layer 180 has a plurality of fifth contact holes 144d and 144e respectively exposing a portion of the end portion 173d and 173e of the second electrostatic-resistant wiring 171d and 171e. The fifth contact holes 144d and 144e are enclosed openings penetrating through the passivation layer 180, such that the passivation layer 180 solely defines the enclosed fifth contact holes 144d and 144e.

Transversal and longitudinal widths of the fourth contact holes 143d and 143e, and the fifth contact holes 144d and 144e may be from about 2 μm to about 12 μm, more particularly, from about 4 μm to about 10 μm. In FIG. 13, a distance D4 between adjacent fourth contact holes 143d and 143e or adjacent fifth contact holes 144d and 144e in the transverse direction, may be from about 2 μm to about 12 μm, and more particularly, from about 4 μm to about 10 μm. Also, a distance D5 between adjacent fourth contact holes 143d and 143e or adjacent fifth contact holes 144d and 144e in the longitudinal direction may be from about 14 μm to about 22 μm, more particularly, from about 16 μm to about 20 μm.

A plurality of contact assistants 95d and 95e including a transparent conductive material such as ITO or IZO, or a metal such as aluminum, silver, chromium, or alloys thereof are disposed directly on the passivation layer 180. The first electrostatic-resistant wiring 131 and the second electrostatic-resistant wiring 171d and 171e are electrically connected to each other through the contact assistants 95d and 95e.

The first electrostatic-resistant wiring 131 and the second electrostatic-resistant wiring 171d and 171e are used to reduce or effectively prevent damage to the circuit due to static electricity in a manufacturing process of a liquid crystal display, and may be applied with the same voltage as the common voltage Vcom or a different voltage from the common voltage Vcom.

Referring to the upper panel 200, the common electrode 270 including of the transparent conductor such as ITO and IZO is disposed on the upper substrate 210.

The lower panel 100 and the upper panel 200 are combined through the sealant 310. The sealant 310 overlaps most of the first electrostatic-resistant wiring 131, and also overlaps most portions of the end portions 133d and 133e of the first electrostatic-resistant wiring 131. The sealant further overlaps the end portions 173d and 173e, and the expansions 175d and 175e of the second electrostatic-resistant wiring 171d and 171e.

Referring to FIG. 14, as described above, the sealant 310 is a conductive sealant including conductive balls 71. Accordingly, the common electrode 270 is electrically connected to the contact assistants 95d and 95e of the lower panel 100 through the conductive balls 71 directly contacting both the common electrode 270, and the contact assistants 95d and 95e. The common electrode 270, the first electrostatic-resistant wiring 131 and the second electrostatic-resistant wiring 171d and 171e are electrically connected to each other through the conductive balls 71 included in the sealant 310.

The detailed description for the conductive ball 71 is the same as the exemplary embodiments in FIGS. 2-6, such that repetitive description is omitted.

When the first electrostatic-resistant wiring 131 and the second electrostatic-resistant wiring 171d and 171e connected to the contact assistants 95d and 95e are applied with the same voltage as the common voltage Vcom, since the common electrode 270 of the upper panel 200 is electrically connected to the contact assistants 95d and 95e through the conductive balls 71, the common electrode 270 thereby receive the common voltage Vcom through the conductive balls 71 from the first electrostatic-resistant wiring 131 and the second electrostatic-resistant wiring 171d and 171e. Accordingly, the common electrode 270 may receive the common voltage Vcom at both edge portions D and E of the upper portion of the liquid crystal display as well as the portions A, B, and C of the liquid crystal display shown in FIG. 1, thereby easily forming the equipotential. Where the short point and the conductive sealant are used together, a uniform equipotential can be formed at the common electrode and a number of the short points can be reduced.

In an alternative embodiment, when the first electrostatic-resistant wiring 131 and the second electrostatic-resistant wiring 171d and 171e are applied with a different voltage from the common voltage Vcom, the end portions 173d and 173e may be physically and electrically separated from the second electrostatic-resistant wiring 171d and 171e, thereby being floated. An exemplary embodiment of separating the end portions 173d and 173e from the second electrostatic-resistant wiring 171d and 171e may include a method such as cutting the expansion 177d and 177e of the second electrostatic-resistant wiring 171d and 171e along a cutting line CC of FIG. 11 and FIG. 12, shown in a dotted line. When the end portions 173d and 173e are separated from the second electrostatic-resistant wiring 171d and 171e, the common electrode 270 is connected in parallel to the first electrostatic-resistant wiring 131 extended in the transverse direction through the conductive balls 71 and the contact assistants 95d and 95e, such that the common electrode 270 may easily form the equipotential through the first electrostatic-resistant wiring 131 which includes a metal having lower resistivity than the common electrode 270 including ITO or IZO.

Since the size and the spacing of the fourth contact holes 143d and 143e and the fifth contact holes 144d and 144e, are made relatively small to a predetermined limit and the density thereof is decreased to a predetermined degree, the contact resistance between the conductive balls 71 included in the sealant 310 and the common electrode 270 may be reduced.

In an alternative exemplary embodiment, a short point may be additionally disposed at the contact assistants 95d and 95e on the fourth contact holes 143d and 143e and the fifth contact holes 144d and 144e. Where the short point structure is used, the conductive sealant may be partially used or not used at all.

According to an exemplary embodiment of the invention, the structure using the short point and the structure using the conductive sealant may be applied together, or one of them without the other may be easily selected according to the manufacturing device of the liquid crystal display.

Also, the contact assistants of the electrostatic-resistant wiring are electrically connected to the common electrode of the upper panel by using a conductive sealant, such that an equipotential may be easily formed at the common electrode.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising: a first substrate and a second substrate facing each other; a sealant which is between and combines the first substrate and the second substrate; a common voltage wiring disposed on the first substrate and transmitting a common voltage, a first insulating layer disposed on the common voltage wiring and comprising: a first contact hole exposing a first region of the common voltage wiring; and a plurality of second contact holes exposing a second region of the common voltage wiring, each second contact hole having a smaller area than the first contact hole in a plan view; a common electrode disposed on a whole surface of the second substrate; a first conductive member disposed between the first substrate and the second substrate, and electrically connecting the common electrode to the common voltage wiring; a first electrostatic-resistant wiring disposed on the first substrate; a second electrostatic-resistant wiring disposed on the first insulating layer; a second insulating layer disposed on the second electrostatic-resistant wiring; and a second conductive member disposed between the first substrate and the second substrate and electrically connecting the common electrode with at least one of the first electrostatic-resistant wiring and the second electrostatic-resistant wiring, wherein the first insulating layer and the second insulating layer includes a fourth contact hole exposing a portion of the first electrostatic-resistant wiring, the second insulating layer further includes a fifth contact hole exposing a portion of the second electrostatic-resistant wiring, a third contact assistant is disposed on the second insulating layer and electrically connects the first electrostatic-resistant wiring and the second electrostatic-resistant wiring to each other through the fourth contact hole and the fifth contact hole, and the second conductive member contacts the third contact assistant.

2. The liquid crystal display of claim 1, wherein an area of the first contact hole is five times or more an area of the second contact hole, in the plan view.

3. The liquid crystal display of claim 2, wherein at least one of a longitudinal width and a transverse width of the second contact hole is equal to or more than 2 micrometers (μm) and equal to or less than 12 micrometers (μm).

4. The liquid crystal display of claim 3, wherein a distance between adjacent second contact holes is equal to or more than 20 μm, and equal to or less than 130 μm.

5. The liquid crystal display of claim 4, further comprising: a first contact assistant disposed on the first insulating layer and electrically connected to the first region and the second region of the common voltage wiring, through the first contact hole and the second contact hole, respectively,
wherein the first conductive member contacts the first contact assistant.

6. The liquid crystal display of claim 5, wherein the first conductive member forms a short point and overlaps at least a portion of the first region of the common voltage wiring.

7. The liquid crystal display of claim 5, wherein the first conductive member is included in the sealant.

8. The liquid crystal display of claim 7, wherein the sealant overlaps at least a portion of the plurality of the second contact holes.

9. The liquid crystal display of claim 8, wherein the first region and the second region of the common voltage wiring are adjacent to each other and are connected to each other.

10. The liquid crystal display of claim 1, wherein at least one of a longitudinal width and a transverse width of the second contact hole is equal to or more than 2 μm and equal to or less than 12 μm.

11. The liquid crystal display of claim 1, wherein a distance between adjacent second contact holes is equal to or more than 20 μm and equal to or less than 130 μm.

12. The liquid crystal display of claim 1, further comprising:
a first contact assistant disposed on the first insulating layer and electrically connected to the first region and the second region of the common voltage wiring, through the first contact hole and the second contact hole, respectively,
wherein the first conductive member contacts the first contact assistant.

13. The liquid crystal display of claim 12, wherein the first conductive member forms a short point and overlaps at least a portion of the first region of the common voltage wiring.

14. The liquid crystal display of claim 12, wherein the first conductive member is included in the sealant, and the sealant overlaps the second region of the common voltage wiring and exposes the first region of the common voltage wiring.

15. The liquid crystal display of claim 14, wherein the first conductive member further overlaps the first region of the common voltage wiring.

16. The liquid crystal display of claim 1, wherein the first region and the second region of the common voltage wiring are adjacent to each other and are directly connected to each other.

17. The liquid crystal display of claim 1, further comprising:
a test signal wire disposed on the first substrate;
a second contact assistant electrically connected to the test signal wire; and
a third contact hole defined in the first insulating layer and exposing a portion of the test signal wire, wherein
the second contact assistant is electrically connected to the test signal wire through the third contact hole, and
the sealant and the second contact assistant do not overlap each other.

18. The liquid crystal display of claim 17, wherein the first conductive member is included in the sealant.

19. The liquid crystal display of claim 1, wherein the second conductive member is included in the sealant.

* * * * *